US010432967B2

United States Patent
Amon et al.

(10) Patent No.: US 10,432,967 B2
(45) Date of Patent: Oct. 1, 2019

(54) MULTIPLEX METHOD AND ASSOCIATED FUNCTIONAL DATA STRUCTURE FOR COMBINING DIGITAL VIDEO SIGNALS

(71) Applicant: Unify GmbH & Co. KG, Munich (DE)

(72) Inventors: Peter Amon, München (DE); Norbert Oertel, Landshut (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 15/716,560

(22) Filed: Sep. 27, 2017

(65) Prior Publication Data
US 2018/0020235 A1  Jan. 18, 2018

Related U.S. Application Data
(63) Continuation of application No. 14/705,173, filed on May 6, 2015, which is a continuation of application (Continued)

(30) Foreign Application Priority Data
Mar. 2, 2009 (DE) .................... 10 2009 011 251

(51) Int. Cl.
*H04N 19/593* (2014.01)
*H04N 19/176* (2014.01)
(Continued)

(52) U.S. Cl.
CPC ............ *H04N 19/593* (2014.11); *H04N 7/16* (2013.01); *H04N 19/11* (2014.11);
(Continued)

(58) Field of Classification Search
None
See application file for complete search history.

(56) References Cited

U.S. PATENT DOCUMENTS

| 5,512,953 A | 4/1996 | Nahumi |
| 5,870,146 A * | 2/1999 | Zhu ..................... H04N 19/176 |
| | | 375/240 |

(Continued)

FOREIGN PATENT DOCUMENTS

| CN | 1835590 A | 9/2006 |
| CN | 1918912 A | 2/2007 |

(Continued)

OTHER PUBLICATIONS

Overview of the H.264/AVC Video Coding Standard; Thomas Wiegand, Gary J. Sullivan, Senior Member, IEEE, Gisle Bjontegaard and Ajay Luthra, Senior Member IEEE; IEEE Transactions on Circuits and Systems for Video Technology; vol. 13, No. 7, Jul. 1, 2003.
(Continued)

*Primary Examiner* — Frederick D Bailey
(74) *Attorney, Agent, or Firm* — Buchanan Ingersoll & Rooney PC

(57) ABSTRACT

Functional data structure for coding a set of digital images. Each of the images is compressed into at least-one first data stream portion, which comprises a portion of the macroblocks reduced by physical redundancies, and-one second data stream portion, which describes the redundancies. For the intraprediction macroblocks, the first data stream portion can be reduced by color value statements with correlations to color values from rows of pixels outside and at one edge of the intraprediction macroblock and for which, in the case of pixels outside the compressed image, a color value default is assumed. The second data stream can comprise intrapredictors for describing the correlations, with coding of an area which is divided into first areas, each of which is occupied by the macroblocks of one of the digital images, and a
(Continued)

second area which spaces apart the first areas and is occupied by default color value pixels.

20 Claims, 3 Drawing Sheets

Related U.S. Application Data

No. 13/146,294, filed as application No. PCT/EP2010/001253 on Mar. 1, 2010.

(51) Int. Cl.

| | | |
|---|---|---|
| *H04N 19/119* | (2014.01) | |
| *H04N 19/159* | (2014.01) | |
| *H04N 19/186* | (2014.01) | |
| *H04N 19/182* | (2014.01) | |
| *H04N 7/16* | (2011.01) | |
| *H04N 21/2343* | (2011.01) | |
| *H04N 21/422* | (2011.01) | |
| *H04N 21/4223* | (2011.01) | |
| *H04N 21/4788* | (2011.01) | |
| *H04N 19/172* | (2014.01) | |
| *H04N 19/61* | (2014.01) | |
| *H04N 19/11* | (2014.01) | |
| *H04N 19/157* | (2014.01) | |
| *H04N 19/40* | (2014.01) | |

(52) U.S. Cl.
CPC ......... *H04N 19/119* (2014.11); *H04N 19/157* (2014.11); *H04N 19/159* (2014.11); *H04N 19/172* (2014.11); *H04N 19/176* (2014.11); *H04N 19/182* (2014.11); *H04N 19/186* (2014.11); *H04N 19/40* (2014.11); *H04N 19/61* (2014.11); *H04N 21/234363* (2013.01); *H04N 21/4223* (2013.01); *H04N 21/42203* (2013.01); *H04N 21/4788* (2013.01)

(56) References Cited

U.S. PATENT DOCUMENTS

| | | | |
|---|---|---|---|
| 5,995,146 A | 11/1999 | Rasmussen | |
| 6,717,607 B1* | 4/2004 | Lauper | H04N 7/142 |
| | | | 348/14.08 |
| 7,386,048 B2 | 6/2008 | Sun et al. | |
| 8,102,916 B1 | 1/2012 | Masterson et al. | |
| 2004/0111526 A1 | 6/2004 | Baldwin et al. | |
| 2005/0231588 A1 | 10/2005 | Yang et al. | |
| 2006/0146734 A1 | 7/2006 | Wenger et al. | |
| 2006/0209950 A1 | 9/2006 | Zhu | |
| 2007/0071099 A1 | 3/2007 | Lee et al. | |
| 2007/0071398 A1 | 3/2007 | Raveendran et al. | |
| 2008/0180574 A1 | 7/2008 | Sadowski | |
| 2009/0147070 A1* | 6/2009 | Marathe | H04N 7/147 |
| | | | 348/14.09 |

FOREIGN PATENT DOCUMENTS

| | | |
|---|---|---|
| EP | 1126710 A1 | 8/2001 |
| WO | 2005079068 A1 | 8/2005 |

OTHER PUBLICATIONS

International Search Report dated May 25, 2010 (English).
International Search Report dated May 25, 2010 (German).
Written Opinion of the International Searching Authority for PCT/EP2010/001253 dated May 25, 2010 (German Translation).
"Video Coding for Low Bit Rate Communication"; International Telecommunication Union, ITU-T, Telecommunication Standardization Sector of ITU, H.263 (Feb. 1998), Series H: Audiovisual and Multimedia Systems.
International Organisation for Standardisation Organisation Internationale De Normalisation; ISO/IEC JTC1/SC29/WG1;1Coding of Moving Pictures and Audio; ISO/IEC JTC1/SC29/WG11 N4668; Mar. 2002; MPEG-4 Overview—(V.21—Jeju Version); Rob Koenen.

* cited by examiner

MULTIPLEX METHOD AND ASSOCIATED FUNCTIONAL DATA STRUCTURE FOR COMBINING DIGITAL VIDEO SIGNALS

CROSS-REFERENCE TO RELATED APPLICATIONS

This application is a continuation application of U.S. patent application Ser. No. 14/705,173, which is a continuation of U.S. patent application Ser. No. 13/146,294, which is the United States National Phase under 35 U.S.C. § 371 of PCT International Application No. PCT/EP2010/001253, filed on Mar. 1, 2010, and claiming priority to German Application No. 10 2009 011 251.0, filed on Mar. 2, 2009.

BACKGROUND OF THE INVENTION

Field of Invention

Embodiments are directed to a functional data structure and a method for generating the functional data structure. The functional data structure and the method are suitable for a multiplex method for combining digital video signals. Embodiments also relate to an encoding software, as well as data carriers and data processing devices.

Background of the Related Art

A digital image consists of a data set that comprises tuples containing specifications for spatial positions and color values of pixels.

The color values used are often color values from the RGB (red-green-blue) color space, especially the RGB color space with values from 0 to 255 per color channel. Alternatively, the YUV color space is often used, in which the color values are divided into a luminance signal Y and two chrominance signals U and V.

In order to offer practical handling for processes such as storage and data transfers via a local communication network or telecommunication network, digital images are compressed.

In data processing, especially with compression algorithms, according to the current state of the art, digital images are divided into macroblocks that consist of pixels encoded with color value specifications and include implicit position specifications. The macroblocks are then used in analyzing redundancies or defining compression units of the digital image.

A compression writes data in at least
  a first data stream portion, which comprises a portion of a data set reduced by redundancies, and
  a second data stream portion that is assigned to the first data stream portion and describes the redundancies.

The first and second data stream portions can preferably be encoded together in one data stream. The first and second data stream portions can also be split into two data streams.

In this way, the original data from the first data stream portion can be regenerated based on the second data stream portion with reintroduction of the redundancies.

Correspondingly, digital images divided into macroblocks can be compressed in
  a first data stream portion, which comprises a portion of the macroblocks, and preferably all macroblocks, reduced by at least spatial redundancies, and
  a second data stream portion that is assigned to the first data stream portion and describes the redundancies.

In lossy data compressions, data are removed that can be considered non-essential when reconstructed for human use. They are not regenerated during decompression. Such lossy data compressions are used in generating MP3 files, for example. Highly compressed file formats like MP3 are based on combinations of lossless and lossy data compressions.

One way to remove spatial redundancies from image data for compression is intraprediction, as described in U.S. Pat. No. 7,386,048, for example, in which examples of intrapredictions and intrapredictors are described.

In the aforementioned compressions of digital images split into macroblocks in first and second data stream portions, intraprediction macroblocks can be used for the compression, in which
  the first data stream portion is reduced by color value specifications with correlations to color values from at least one row of pixels, which is located outside and at one edge of the intraprediction macroblock, and
  the second data stream portion comprises intrapredictors for describing the correlations.

The correlations are, in particular, identity of the color values of pixels or similarities of the color values of pixels with those in the rows of pixels that lie outside and on one edge of the intraprediction macroblock.

The intrapredictors thereby generate instructions to assume color values of correlated pixels from this row or these rows of pixels for a pixel in the intraprediction macroblock.

If a digital image that is compressed does not itself contain any such rows of pixels, i.e., if an intraprediction macroblock has an edge in common with the edge of the digital image, then standard compression algorithms assume a row of pixels with a default color value.

This state-of-the-art aspect of image compression is illustrated in FIGS. 1a and 1b.

FIG. 1a shows three same-size macroblocks within an edge 4 of a digital image: A first macroblock 1 lies in the upper left corner of the digital image. A second macroblock 2 lies between the first macroblock and a third macroblock 3. Adjacent to the third macroblock 3 is an L-shaped area 5 of pixels that are used for a DC intraprediction. This means that, for a compression with this DC intraprediction, all of the pixels in the L-shaped area 5 that lie outside of the edge 4—i.e., in FIG. 1a lie above the third macroblock 3—are assumed to have a default color value corresponding to the medium gray value 128 from the RGB color space or the YUV color space with values of 0 to 255.

FIG. 1b shows an arrangement of the corresponding compressed macroblock 3 in a larger scope, which is part of a digital image. In this image, above the row with the first, second, and third macroblocks 1, 2, and 3 shown in FIG. 1, additional macroblocks 6 and 7 are arranged in a row. When the third macroblock 3 is decompressed, with the help of the intrapredictors from the second data stream portion, pixels in this block are assigned color values of pixels in the macroblock 7 that overlaps the L-shaped area 5 shown in FIG. 1b. For this, assignments are made for which, in place of the medium gray value described for a pixel when compressed, another color value from a pixel in the overlapping macroblock 7 is assigned. This causes decompression errors.

If pixels from the macroblock 3 decompressed with errors are used for further intrapredictions in compressing or decompressing the digital image, the error can be compounded over large portions of the digital image.

If pixels from the macroblock 3 decompressed with errors are used for intrapredictions in timed image sequences such as videos, the error can be compounded over a long running period of the video.

In video image sequences, macroblocks of the images, which can be luminance areas of 16×16 pixels, exist not only in a spatial but also in a time-related context.

For software applications in computer systems as well as for video conferencing applications, image recordings of multiple timed sequences, i.e., time values of assigned images, are included and the timed sequences are synchronized with each other. In this way, in video conferences, each video conference participant or each group of video conference participants records videos that comprise image recordings of a timed sequence and usually related sound recordings, plus other recordings if applicable. These recordings are synchronized in time, so that the video conference participants or groups of video conference participants can play the recordings of some or all video conference participants or groups of video conference participants simultaneously.

The recordings of video conference participants or groups of video conference participants are generally sent by video conference applications via data networks to a central server, such as a multipoint control unit (MCU), where they are compiled and sent back via data networks to the video conference participants or groups of video conference participants. To do this, recording data must be compressed, sent to a central server, compiled there, sent from there in compressed form to the participants or groups of participants, and then can be decompressed and decoded.

For transmitting and sending data via data networks, the data volumes transmitted or sent determine the requirements for hardware and network resources, and these are limiting factors for video conference applications. Compression of recorded data is therefore essential.

When synchronous video image sequences from different video conference participants are compiled in compressed form in a multipoint control unit and sent to all video conference participants, the problems described above with reference to FIGS. 1a and 1b appear. A compressed macroblock 3 for an image from a received video image sequence can be placed adjacent to a macroblock 7 of a synchronous image from another video image sequence, and then after reception and decoding or decompression of the compiled video image sequences at the video conference participant's end, errors occur with the resulting poor image quality.

According to the current state of the art, compressed recording data are received by a multipoint control unit, where they are fully decompressed, compiled, then recompressed and finally sent out. Such methods have high hardware resource requirements and can also involve unacceptable transmission delays. There are known encoding standards for compressing video data, such as H.264/MPEG-4 AVC in particular. In video standard H.264/AVC, the following intrapredictions for luma probes are defined:
  8 directional intraprediction modes plus one DC prediction mode for blocks with 4×4 pixels,
  8 directional intraprediction modes plus one DC prediction mode for blocks with 8×8 pixels,
  3 directional intraprediction modes plus one DC prediction mode for blocks with 16×16 pixels.

The directional intraprediction modes use an area 5, as illustrated in FIGS. 1a and 1b, with a row of pixels from blocks 7, 2, which are adjacent to intraprediction block 3, above or to the left of the related intraprediction block 3. These directional intraprediction modes instruct at least some of these pixels to be copied to intraprediction block positions that lie in a predetermined direction from the copied pixel. These directions run downward, to the right, or in varying diagonals from the sides of the L-shaped area 5 shown in FIGS. 1a and 1b to intraprediction block 3. For the DC prediction modes, an average color value for pixels in an area 5 shown in FIGS. 1a and 1b is used to predict the color value of all pixels in the intraprediction block. Especially in these DC prediction modes, the decompression errors mentioned above with reference to FIGS. 1a and 1b have a strong detrimental effect on image quality.

Newer transfer formats corresponding to H.264/AVC for video data, allow the compiling of synchronous video image sequences from different video conference participants as groups of compressed macroblocks, in which they encode information that prohibits intrapredictions, i.e., intraprediction modes for macroblocks in a video image sequence for a video conference participant, that refer to pixels outside of the edges of the images in this video image sequence. However, these transfer formats are not universally applicable for decoders that do not process this information. With the current state of the art, video conference participants who do not use decoders that decode information prohibiting certain intrapredictions cannot receive many video conferences. Supplying numerous video conference participants with suitable new decoders is an inefficient solution to this problem, especially in view of the costs involved.

BRIEF SUMMARY OF THE INVENTION

We would like to send compressed recordings of video data efficiently, especially with respect to the hardware and/or software resources required. Preferably such compilations could be handled easily by a central server without first decompressing them and to make them decodable by many decoder types.

Embodiments may address this goal with a method and a functional data structure for encoding a set of at least two digital images that are divided into macroblocks of pixels encoded with color value specifications, including intraprediction macroblocks, whereby each image is compressed in at least
  a first data stream portion, which comprises a portion of the macroblocks reduced by at least spatial redundancies, and
  a second data stream portion that is assigned to the first data stream portion and describes the redundancies,
wherein, for each of the intraprediction macroblocks,
  the first data stream portion is reduced by color value specifications with correlations to color values from at least one row of pixels, which is outside of and assigned to one edge of the intraprediction macroblock and for which, in the case of pixels outside of the compressed image, a default color value is assumed,
  and the second data stream portion comprises intrapredictors for describing the correlations.

The color values used can be luminance and/or chrominance values.

The macroblocks can consist of square spaces of the same size, each with the same number of pixels.

The first data stream portion can be reduced by color value specifications with correlations to color values from at least one row of pixels, which is located outside and at one edge of the intraprediction macroblock. In particular, the row of pixels can be located at an upper or left edge of the macroblock.

The invention includes the encoding of one space, which is divided into first spaces, each of which is occupied by the macroblocks for one of the digital images, and a second space that separates the first spaces from each other and is occupied by pixels with the default color value.

This encoding according to the invention prevents decompression errors in intrapredictions, because the color value assignments for a default color value, as described above with reference to FIG. 1a for macroblocks located at the edge of an image, and also for decoding compiled images, are guaranteed because the second space separates the first spaces from each other and has pixels with the default color value.

The macroblocks preferably consist of square spaces of the same size, each with the same number of pixels, and the second space separates every two first spaces, parallel at a corresponding distance to one of the square macroblocks. In this way data are prepared that are especially well suited to standard decoding with decompression in blocks.

The L-shaped area 5 illustrated in FIG. 1a with pixels used as predictions for the intraprediction block 3, extends beyond this intraprediction block 3 on the right in FIG. 1a. When the digital images are compressed, the default color value can be assumed for pixels in the area that extends beyond the intraprediction block 3 and can be used for an intraprediction. To prevent decompression errors when decoding a set of images, for which the overextending area extends into an image in that set, preferably the second space also has an edge of the space that is divided into the second and first spaces. In particular, if the invention is applied to video conference systems, the digital images are time-synchronized images with differently timed image sequences, especially data sets of I-frames from video image recordings.

The first data stream portion is then advantageously reduced by space and time redundancies, wherein at least one method in particular is used, which is selected from a compression based on a frequency analysis, especially by discrete cosine transformation, and/or on the basis of quantification and/or entropy encoding.

The method and data structures described above can be used in multiplex methods to compile digital video signals and can be implemented as encoding software, which preferably comprise
- a unit for receiving the compressed images via a telecommunication network and
- a unit for sending data encoded by the encoding software via a telecommunication network.

Software or data structures according to the invention are stored on data storage media.

A data processing system with such a data storage medium, which is equipped with encoding software per the invention, is also one aspect of the invention.

BRIEF DESCRIPTION OF THE FIGURES

Aspects and an exemplary embodiment of the invention are described below with reference to the figures, in which:

FIGS. 1a and 1b illustrate the design of a functional data structure for encoding a set of two digital images in a conventional multipoint control unit. The digital images are divided into macroblocks 1, 2, 3, 6, and 7 of pixels encoded with position and color value specifications, including intraprediction macroblock 3, wherein each image is compressed. One of the images with macroblocks 1, 2, 3 at its edge 4 is received by the multipoint control unit and compiled with a data set with macroblocks from another digital image having macroblocks 6 and 7 in such a way that the macroblocks 7 contain pixels to which intrapredictors for the intraprediction macroblock 3 refer.

Figure 1A:
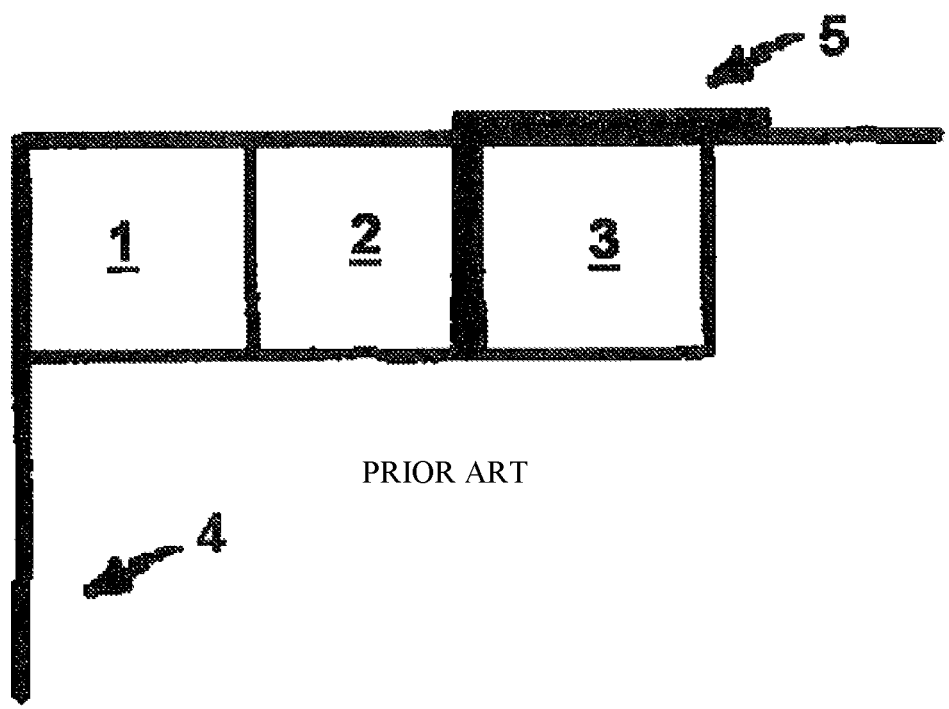
FIGS. 1a and 1b show schematic illustrations of macroblocks in different parts of a digital image and FIG. 2 shows a schematic illustration of a data structure according to the invention.
Figure 1B:
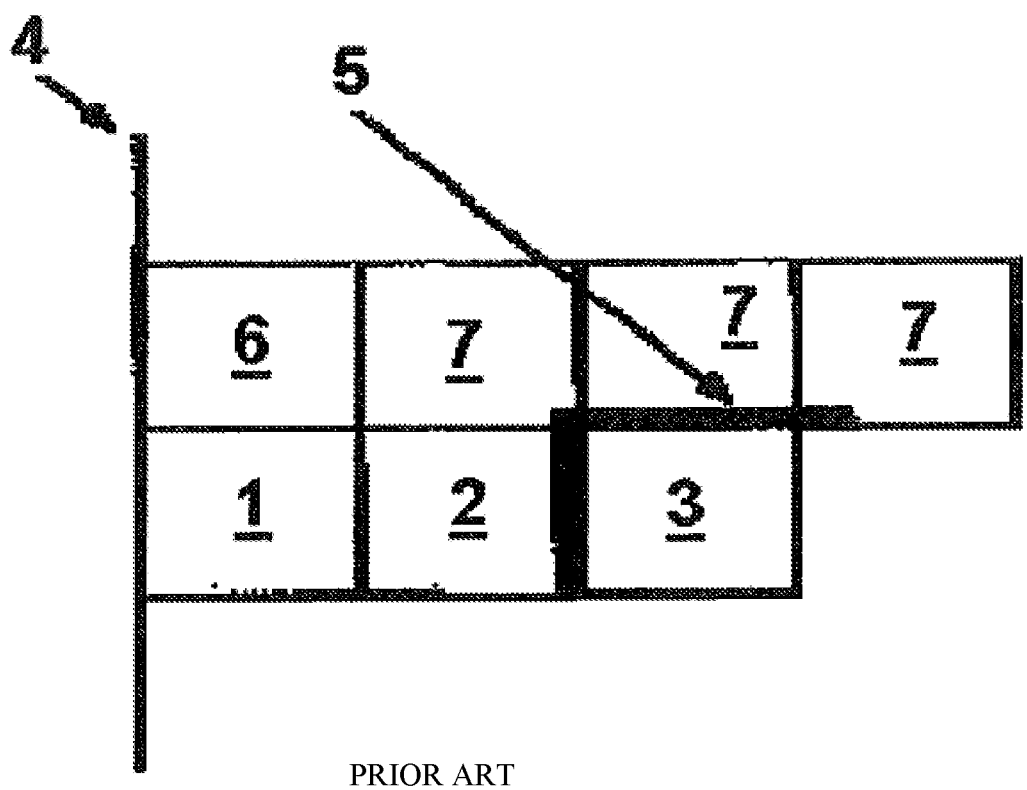
Figure 2:
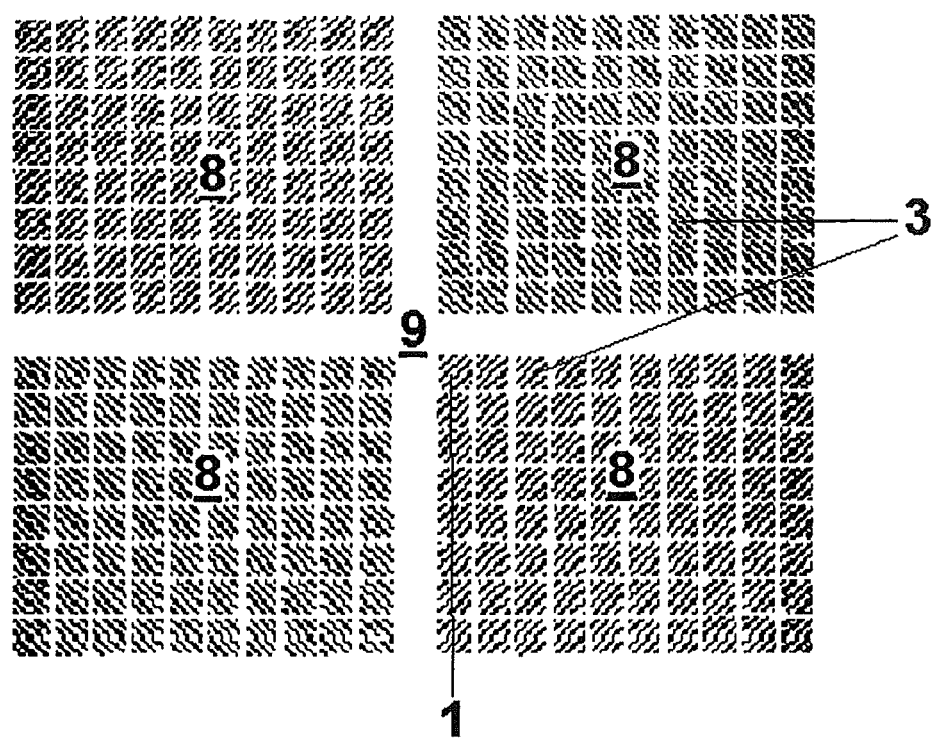

Such a compilation is avoided in the functional data structure for encoding a set of four digital images according to the invention, shown in FIG. 2.

LIST OF REFERENCE NUMBERS 1, 2, 6, 7 Macroblocks
3 Intraprediction macroblock
4 Edge
5 Pixel area for intrapredictions
8 first space
9 second space

DETAILED DESCRIPTION OF THE INVENTION

This functional data structure according to embodiments of the invention is created in a multipoint control unit according to the invention with encoding for a space that is divided into first spaces 8, each of which is occupied by macroblocks 1 and 3 for each of the four digital images, and a second space 9 that separates the first spaces 8 from each other. The macroblocks 1 and 3 are compressed and comprise intraprediction macroblocks 3, which are reduced by color value specifications with correlations to color values from at least one row of pixels, which is outside of and assigned to one edge of the intraprediction macroblock and for which, in the case of pixels outside of the compressed image, a default color value is assumed. All pixels in the second space 9 have this default color value.

The multipoint control unit according to the invention receives four digital images, each of which is divided into macroblocks of pixels encoded with position and color value specifications, including intraprediction macroblocks, wherein each image is compressed according to the H.264/AVC standard.

The macroblocks 1 and 3 have square spaces of the same size, each with the same number of pixels, and the second space 9 separates every two of the first spaces 8 parallel at a distance corresponding to one of the square macroblocks 1 and 3. In the first spaces 8, time-synchronized images of different data sets of frames from video image recordings are arranged by four video participants. The video image recordings are reduced by space and time redundancies corresponding to a combination of compressions according to the H.264/AVC standard.

A timed sequence of sets of four compressed images as shown in FIG. 2, corresponding to the time-synchronized sequences of the video image recordings received by the four video participants, comprises data sets with the data structure illustrated in FIG. 2. This timed sequence of sets of compressed images is sent by the multipoint control unit. For receiving and sending, the multipoint control unit has
- a unit for receiving the compressed images via a telecommunication network and
- a unit for sending data encoded by the encoding software via a telecommunication network.

The data sent can be received and displayed with high quality by a large number of decoders.

Although the figures refer to a video conference application, the invention is generally applicable to any applications that involve the preparation of sets of compressed image data, at least part of which can be compressed by intraprediction. Such applications are especially interesting for web service images offered on the Internet.

The invention claimed is:

1. A method for coding a set of at least two compressed digital images received from at least two video participants of a video conference in a multipoint control unit, wherein the compressed digital images are chronologically synchronous images of different chronological image sequences in different data sets of the at least two video participants and are divided into macroblocks of pixels coded with color value statements, including intraprediction macroblocks; wherein the coding occurs in an area which is divided into first areas, each of which is occupied by the said macroblocks of one of the compressed digital images, and a second area by which the first areas are spaced in parallel from each other, wherein the second area is occupied by pixels with a color value default for the intraprediction, to avoid decompression errors during intrapredictions, wherein all the pixels of the second area have this color value default and the second area in each case spaces apart two of the first areas in parallel by a distance corresponding to at least one of the quadratic macroblocks; the method comprising:

compressing each of the images into at least a first data stream portion which comprises at least one portion of the macroblocks, said portion being reduced by at least physical redundancies for transmission of the compressed images to video conference participants as a compilation of the different chronologically synchronous images received from the at least two video participants, and a second data stream portion assigned to the first data stream portion, said second data stream portion describing the reduced physical redundancies, wherein for each of the intraprediction macroblocks, the first data stream portion is reduced by color value statements with correlations to color values from at least one line of pixels which are arranged outside and on an edge of the intraprediction macroblock and for which the color value default is used in the case of pixels outside the compressed image, and the second data stream portion comprises intrapredictors to describe the correlations to the color values; and wherein the color value default is a pre-selected color value that separates the first areas from the second area so that all pixels in the second area have a same color value for separation of the different digital images received from the at least two video participants that are compressed into the first data stream portion during the compressing of each of the images so that the first data stream portion is decompressible and decodable for displaying the at least two digital images of the compilation of the different chronologically synchronous images.

2. The method according to claim 1, wherein the macroblocks have quadratic areas of the same size, each of which have the same number of pixels.

3. The method according to claim 1, wherein the at least one line of pixels is arranged on a top or a left edge of the intraprediction macroblock.

4. The method according to claim 1, wherein the digital images are chronologically synchronous images of different chronological image sequences.

5. The method of claim 4, wherein the compressing is performed such that the first data stream portion is reduced by physical and chronological redundancies.

6. The method according to claim 5, wherein the compressing is performed such that the first data stream portion is reduced by via a frequency analysis, a discrete cosine transformation, quantisation, or entropic coding.

7. The method according to claim 1, wherein the digital images frames of video image recordings.

8. A non-transitory computer readable medium having a program stored therein such that when a multipoint control unit runs the program, the multipoint control unit performs the method of claim 1.

9. The multipoint control unit of claim 8, wherein the multipoint control unit is a server of a video conference system or a central server of a video conference system.

10. The multipoint control unit of claim 8, wherein the encoding performed by the multipoint control unit is performed without first decompressing the compressed digital images.

11. A method for coding a set of at least two digital images received from at least two video participants in a multipoint control unit without decompressing the digital images, wherein the digital images are chronologically synchronous images of different chronological image sequences in different data sets of the at least two video participants, the method comprising:

dividing the digital images from the video participants into macroblocks of pixels coded with color value statements that include intraprediction macroblocks that occurs in an area that is divided into first spaces and a second space without decompressing the digital images, each of the first spaces being occupied by the macroblocks of a respective one of the digital images, the second space spacing the first spaces from each other, the second space being occupied by pixels with a default color value for intraprediction to avoid decompression errors during intraprediction and wherein all the pixels of the second space have the default color value; and compressing each of the digital images into at least:

a first data stream portion having at least one portion of the macroblocks that is reduced by at least physical redundancies for transmission of the compressed digital images to video conference participants as a compilation of the different chronologically synchronous images received from the at least two video participants, and a second data stream portion assigned to the first data stream portion that describes the redundancies; and wherein for each of the intraprediction macroblocks, the first data stream portion is reduced by color value statements with correlations to color values from at least one line of pixels that are arranged outside of the intraprediction macroblock on an edge of that intraprediction macroblock and wherein pixels outside the compressed image have the default color value;

wherein the default color value is a pre-selected color value and each and every pixel in the second space has a same color value to separate the first spaces from the second space for separation of the different digital images received from the at least two video participants that are compressed into the first data stream portion during the compressing of each of the images so that the first data stream portion is decompressible and decodable for displaying the at least two digital images of the compilation of the different chronologically synchronous images; and the second data stream portion comprises intrapredictors to describe the correlations.

12. The method of claim 11, wherein the first data stream portion is reduced by physical and chronological redundancies.

13. The method of claim 12, wherein the second space separates every two of the first spaces at a distance corresponding to one of the macroblocks.

14. A multipoint control unit, comprising:

a receiver configured to receive digital images from devices of multiple video participants via a telecommunication network, the digital images being chronologically synchronous images of different chronological image sequences in different data sets received from the devices of the video participants;

a non-transitory storage medium having encoding software stored thereon that configures the multipoint control unit to encode the received digital images, the encoding performed by the multipoint control unit via the encoding software comprising:

dividing the digital images into macroblocks of pixels coded with color value statements that include intraprediction macroblocks that occur in an area that is divided into first spaces and a second space without decompressing the compressed digital images, each of the first spaces being occupied by the macroblocks of a respective one of the digital images, the second space spacing the first spaces from each other, the second space being occupied by pixels with a default color value for intraprediction to avoid decompression errors during intraprediction, wherein all the pixels of the second space have the default color value, compressing each of the divided digital images into at least:

a first data stream portion having at least one portion of the macroblocks that is reduced by at least physical redundancies for transmission of the compressed images to video conference participants as a compilation of the different chronologically synchronous images received from the at least two video participants, and a second data stream portion assigned to the first data stream portion that describes the redundancies, and for each of the intraprediction macroblocks, the first data stream portion is reduced by color value statements with correlations to color values from at least one line of pixels that are arranged outside of the intraprediction macroblock on an edge of that intraprediction macroblock and wherein pixels outside the compressed image have the default color value and the second data stream portion comprises intrapredictors to describe the correlations;

wherein the default color value is a pre-selected color value and each and every pixel in the second space has a same color value to separate the first spaces from the second space for separation of the different digital images received from the at least two video participants that are compressed into the first data stream portion during the compressing of each of the images so that the first data stream portion is decompressible and decodable for displaying the at least two digital images of the compilation of the different chronologically synchronous images; and a transmitter configured to send data encoded by the multipoint control unit via the telecommunications network; and wherein the encoding performed by the multipoint control unit is performed without first decompressing the compressed digital images.

15. The multipoint control unit of claim 14, wherein the default color value is a luminance value or a chrominance value.

16. The multipoint control unit of claim 14, wherein the second space separates every two of the first spaces at a distance corresponding to one of the macroblocks.

17. The multipoint control unit of claim 16, wherein the at least one line of pixels is at a top edge or a left edge.

18. The multipoint control unit of claim 14, wherein the data sets are comprised of I-frames of video image recordings.

19. The multipoint control unit of claim 14, wherein the first data stream portion is reduced by physical and chronological redundancies.

20. The multipoint control unit of claim 14, wherein the encoding of the digital images is performed such that decompression errors in intrapredictions is prevented.

* * * * *